United States Patent Office 2,999,755
Patented Sept. 12, 1961

2,999,755
FLUID SHORTENING AND METHOD OF MAKING THE SAME
Edward Handschumaker, Williamsville, and Horst G. Hoyer, Buffalo, N.Y., assignors to Spencer Kellogg and Sons, Inc., Buffalo, N.Y.
No Drawing. Filed Aug. 19, 1959, Ser. No. 834,629
16 Claims. (Cl. 99—118)

The present invention relates to liquid shortenings which are suitable for use in the preparation of batters and doughs. The liquid shortening of the present invention comprises salad oil having uniformly dispersed therein controlled amounts of selected monoglycerides of higher saturated fatty acids having more than 18 carbon atoms.

It has been recognized that certain advantages reside in the use of liquid shortenings over the plasic shortenings, in ease of handling as well as ease of measurement and usage of shortening. Substantial savings are inherent in the use of liquid shortenings as compared to the conventional plasticized solid shortenings both as a consequence of less waste material and the shorter time required to prepare batters with the former.

The use of fluid shortening in a wide variety of fat, rich, sweet baked goods may also have important dietary advantages. Research in the atherosclerosis prevention field has recently developed evidence to support the belief that unsaturated vegetable oils are less apt to contribute to atherosclerotic conditions than are the hydrogenated vegetable fats or animal fats used in plastic shortenings. Replacing the apparently less desirable hard fats with the safer unsaturated natural vegetable oils in a wide variety of baked goods may thus constitute a significant contribution toward reducing the incidence of heart disease.

In spite of the well recognized advantages associated with the use of liquid shortenings and in the light of the prior art the commercial employment of such products has so far been negligible. This is due to the fact that the correct combination of functional properties needed to render liquid shortenings suitable for general cake baking use have not previously been developed. The correct combination of properties in this case refers to a liquid shortening product in which is incorporated for reasons of economy, among others, the minimum level of additives homogeneously dispersed to allow easy handling in commercial channels, and which possesses the required cake batter aerating properties to enable bakers and housewives to use the product in the full range of cake batters wherein the specific batter aerating properties of the shortening included in the recipes constitute a controlling factor in the quality of the baked cake.

We have made the important discovery that saturated fatty acid monoglycerides are not alike in their cake batter aerating properties as was heretofore believed, and that by selecting the proper saturated fatty acid monoglycerides optimum cake baking results can be obtained in the conventional recipes with economically small amounts of the preferred monoglycerides. We have also discovered a novel process whereby a stable homogeneous suspension of the relatively minor amounts of the preferred monoglycerides required can be produced in a normally liquid triglyceride edible oil such as salad oil very simply and at a significant reduction in manufacturing cost over the processes mentioned in the prior art.

In addition, our discoveries include a method of activating the preferred saturated fatty acid monoglycerides homogeneously suspended in a liquid shortening medium which consistently assures optimum cake baking results. Finally, we have found that the inclusion of a minor amount of edible grade lecithin along with the preferred monoglycerides in the liquid shortening serves to extend the range of usefulness of the liquid shortening to the manufacture of high sugar white cakes which have become quite popular in recent years. The commercial manufacture and employment of liquid shortenings can now be realized in practice by making use of the foregoing discoveries. These discoveries will herein be described in greater detail and illustrated by suitable examples.

Experience has conclusively demonstrated that it is absolutely essential that an additive having emulsifying and batter aeration properties be added to a salad oil before it can be made to perform satisfactorily in most cake batters regularly employed in household as well as in commercial baking.

Liquid shortenings containing certain sorbitan esters have been prepared which have good cake batter aeration properties but the use of these sorbitan esters to the extent that their incorporation in liquid shortenings would require has not been approved by virtue of an element of doubt residing in their safety as food additives. Furthermore suspensions of these emulsifiers in salad oil tend to settle rapidly rendering the product difficult to handle. Among the available emulsifiers only the monoglycerides and a few related compounds have been cleared for food use by the Food and Drug Administration.

Fatty acid monoglycerides and diglycerides in which the fatty acids involved are largely unsaturated dissolve quite readily in a salad oil medium, but liquid shortenings made with this type of emulsifier will not yield satisfactory cakes of which pound cakes can be used as a representative example. However, certain saturated fatty acid partial glyceryl ester emulsifiers can be used in liquid shortenings. These saturated fatty acid partial esters of glycerine are not soluble in or miscible with the salad oil medium at ambient temperatures and must therefore be suspended in the salad oil substrate in solid form.

While we do not wish to limit the present invention to any particular theory it appears that the monoglycerides used in liquid shortenings have more than one function to perform in the preparation of cake batters which will yield satisfactory baked cakes. In the early stages of batter preparation it is essential that the additives act as emulsifiers, probably because emulsions absorb air much more readily than solutions or suspensions. For example, witness the whipping qualities of cream which is an emulsion of fat and water as compared with weak foaming properties of skim milk which includes substantially no emulsified fat. Secondly, it is apparently necessary that a significant number of finely dispersed air cells enclosed in solid fat be created during the preparation of the batter. Our experience indicates that the sequential steps of emulsification, foaming (air incorporation) and the production of a sufficient number of solid fat enclosed air cells must all take place in orderly fashion during the preparation of the batter before a liquid shortening will yield satisfactory cakes such as pound cakes, white cakes, yellow cakes etc.

When a saturated fatty acid monoglyceride of the prior art for example is dispersed in salad oil at ambient temperature it has by virtue of its very low solubility little or no emulsifying properties; when liquid shortenings containing such additives are used as such in most conventional cake batters the latter will fail to incorporate air, probably because the first of the above mentioned sequential functional requirements was not met— e.g. namely an emulsion susceptible to foaming, whipping or air incorporation was not formed.

When on the other hand a soluble emulsifier is used in the liquid shortening the emulsification and foaming steps take place but in this case there are no solid fat particles present in the batter to entrap the required fine air cells and again cake failures result. Similarly combinations of soluble emulsifiers based on unsaturated fatty acids and stable suspensions of inert saturated fatty acid triglycerides also fail because the small stable solid triglyceride fat crystals resist the incorporation of the fine air cells and cake failures result. We have discovered that if converted to the alpha crystalline form before addition to a cake batter, monoglycerides of saturated fatty acids have both the emulsifying and the air cell entrapping qualities required to render them effective in liquid shortening media. We have also found that when employed in the alpha crystalline form the monoglycerides of fatty acids having a chain length greater than eighteen carbon atoms are considerably more effective as liquid shortening additives than the corresponding monoglycerides of fatty acids having a chain length of eighteen carbon atoms or less. These two important discoveries are closely related. Until we discovered how to properly activate the saturated fatty acid monoglycerides the art recognized no functional difference among the available saturated fatty acid monoglycerides ranging from sixteen to twenty-two carbon atoms. These important discoveries now render it feasible to offer to the baking industry as well as to domestic consumers a stable liquid shortening which has the required cake batter aerating properties to fit all their baking needs at an economically attractive price.

Tremble and Fink U.S. 2,532,523 describes a method for the preparation of certain cake batters using salad oil and glyceryl monostearate or glyceryl distearate at relatively high concentrations. In this case the salad oil-glyceryl partial ester mixture was heated to melt and dissolve the normally solid glyceryl partial ester in the salad oil and it was specified that the resulting solution be added to the remaining batter ingredients before any solids were allowed to separate from solution. Cake failures were reported to result if the normally solid glyceryl partial esters were permitted to crystallize or otherwise separate from solution before the liquid shortening mixture was added to the rest of the cake batter ingredients. On the contrary we have discovered that the liquid shortenings of this invention work best in cake batters when the preferred normally solid partial glyceryl esters are present in the solid crystalline state as the liquid shortening is incorporated into the batter. Excellent pound cakes have been made when liquid shortening of this invention have been allowed to stand up to 70 minutes after the preferred normally solid glyceryl partial esters of this invention had been crystallized from solution in the salad oil substrate. It is significant from the examples herein described that our excellent cake baking results were achieved with considerably lower concentrations of the normally solid glyceryl partial esters than those required by Tremble and Fink.

A liquid shortening product is described by Andre and Going U.S. 2,815,286 and wherein a mixture of fully saturated triglycerides and fully fatty saturated mono and diglycerides i.e., solid glycerides, is suspended at room temperature in a liquid triglyceride oil base in such a fashion as to guarantee that the major part (at least 80%) of the solid glycerides present in the fluid shortening exists in the stable beta crystalline polymorphic form. The principal virtues claimed for this product are associated with resistance to gelling or loss of fluidity and to settling or in other words, suspension stability. The claimed benefits are obtained by expediting the crystal phase transformation of the suspended solid glycerides to the stable beta form by a special tempering process.

The polymorphic behavior of saturated fatty acid glycerides has been adequately described by Andre and Going in U.S. 2,815,286 and in A. E. Bailey's Melting and Solidification of Fats. Briefly, it has been established that normally solid saturated fatty acid glycerides and in particular saturated fatty acid monoglycerides are very sparingly soluble in normal liquid triglyceride media at ambient temperatures but at temperatures above the melting points of the normally solid glycerides they become completely miscible with or dissolve in the liquid triglycerides. It has also been demonstrated that saturated fatty acid glycerides tend to exist in more than one crystalline form. These crystalline forms have been called alpha, beta prime, and beta. When the molten saturated fatty acid glycerides are allowed to cool, crystals first begin to appear when the temperature drops below the melting point of the alpha crystalline form and the crystals formed exhibit the alpha structure as determined by X-ray diffraction pattern and by melting point. These alpha crystals are relatively unstable and consequently transform into the beta prime form more or less rapidly depending on the chain length of the saturated fatty acid involved. Some solid glycerides are capable of existing for relatively long periods in the beta prime form but generally it is believed that nearly all saturated fatty acid glycerides will ultimately transform to the beta crystalline form which has been shown to be the most stable configuration.

It is well known in the art that certain kinds of fat crystals notably the beta prime form have the capacity to intertwine or interlock when suspended in a liquid substrate, in such a fashion as to provide a degree of rigidity to the entire mass if the solids are present in sufficient amounts. Sufficient structure to interfere with the free flowing properties of a mixture can occur at solid fat levels down to 5%. The solid appearance of plastic fats such as shortening, margarine, lard etc., is based upon this particular structure building capacity of saturated fatty acid glycerides existing largely in the beta prime form. Most plastic fat mixtures used in shortenings and margarines etc., include only about 15–25% of glycerides which are actually solid at room temperature, the remainder being present in liquid form held together in a relatively rigid non-flowing state by the structure built up largely by the beta prime form saturated fatty acids glyceride crystals dispersed in the liquid substrate.

Mitchell U.S. 2,521,242 showed that beta phase crystals of saturated fatty acid glycerides lacked the structure building characteristics of the corresponding beta prime crystals so that slurries containing up to 60% of beta crystals remained fluid. Holman and Sanders U.S. 2,815,286 derived a method for quickly converting beta prime fat crystals to beta crystals in liquid oil media and Andre and Going, U.S. 2,815,285 applied the same process to liquid shortenings containing about 5% of mixed saturated fatty acid glycerides.

We have not found it necessary to employ such methods to hasten the crystal phase transformation of the solid monoglycerides in the liquid shortenings of this invention because the product retains its free flowing characteristic regardless of whether the monoglycerides are in beta prime or the beta form because the concentration of solids (about 1.5%) is in any event insufficient to interfere with fluidity.

Liquid and plastic shortenings are basically similar products in the sense that each comprises a mixture of normally solid and normally liquid glycerides. In each case the liquid glycerides predominate and act as the substrate for the solid glycerides which are finely dispersed therein.

The prior art recognized this similarity between plastic and liquid shortenings in using the very same process and equipment to make both products.

Andre and Going in U.S. 2,815,285 and Brock 2,868,652, prepare liquid shortenings by chilling relatively warm solutions of solid glycerides in normally liquid glycerides to produce small fat crystals using a Votator as the heat exchanger in the manner in which it has been used for many years to manufacture plastic shortening.

We have discovered a unique process which incorporates significant economies especially in the use of heat and refrigeration, and requires no heat exchanger such as a Votator. In our process heat is applied to only about 10% of the liquid shortening product, i.e., a minor amount thereof. The remainder of the lot when mixed with the heated part serves to cool the heated part sufficiently to cause the normally solid glycerides to crystallize. Although the crude slurry thus produced does not have adequate suspension stability, we have found that if this slurry is passed through a colloid mill within a short controlled period of time after the slurry is formed a finely dispersed stable suspension results. Indications are that in the alpha crystalline form the solid glycerides in the liquid shortenings of this invention are particularly amenable to dispersion by the colloid mill. If the crude suspensions are allowed to stand too long before being milled the slurry fails to respond to milling and unstable, quick settling suspensions result. The maximum allowable time interval between the formation of the crude slurry and milling will probably vary with the composition of the solid glycerides, but for the products of this invention it was found to be about 30 minutes.

In the practice of this invention we have found that the desired cake batter aerating properties in a fluid shortening are most efficiently and economically provided by the monoglyceride esters of saturated fatty acids having a chain length greater than eighteen carbon atoms. Our experience indicates no particular virtue in the simultaneous presence of saturated fatty acid diglycerides or triglycerides in fluid shortening. Although the diglycerides are known to have some emulsifying properties in cake batters, they are very weak indeed as compared with the corresponding monoglycerides and since on an equivalent performance basis the commercially available distilled monoglyceride concentrates are more economical, we see no particular value in including significant levels of diglycerides in the product of this invention. Furthermore, our data shows that diglycerides of saturated fatty acids tend to interfere with the monoglycerides in a liquid shortening product. Commercial scale cake baking tests also tended to be more erratic when excessive levels of diglycerides were present in the liquid shortenings. It should be noted, however, that small amounts of diglycerides can be tolerated when used with the low level of long chain monoglycerides of the present invention.

Largely for economic reasons, but to some extent due to erratic baking performance we have found it was best to avoid the inclusion of excessive concentration of diglycerides along with the preferred monoglycerides in the liquid shortenings of this invention. The employment of the readily available commercial distilled monoglycerides at 80% or higher purity serves automatically to restrict the diglycerides to not more than about 20% of the monoglyceride content of the emulsifier concentrate used.

Furthermore the excellent pound cake volumes obtained with our liquid shortening products containing so little as about 1.25% to 1.75% of suspended solid fat demonstrates conclusively that in the practice of our invention there is also no need to build up the solids content of the liquid shortening by adding inert saturated triglyceride material to the formulation.

While some liquid shortenings of the prior art will under certain conditions make an acceptable yellow layer cake using a non-critical household recipe, they will fail completely in pound cakes and practically all other similar type commercial or household cakes wherein the shortening plays an important role in batter aeration.

When the fluid shortenings of this invention are used as prescribed in the invention, excellent pound cakes, high sugar white cakes, devils food cakes, as well as high sugar yellow cakes, result which are equal in volume and quality to those obtained with commercial plastic superglycerinated shortenings. Equivalent results are likewise obtained with comparable household recipes.

The overall baking performance of our preferred liquid shortenings are significantly enhanced by the inclusion of an appropriate amount of lecithin in the formulation. While satisfactory cakes of some kinds like pound cakes for example, can be made with liquid shortening containing no added lecithin, the presence of lecithin greatly enhances the performance of our liquid shortening when it is used in high sugar white cakes. As the ratio of sugar to flour is increased from 1.00 to 1.40, white layer cakes made with fluid shortenings of the preferred formulation, but without lecithin exhibit a gradual deterioration of the crust color, followed by sunken centers and diminished cake volume.

The addition of from about 0.5% to about 1.25% of lecithin derived from vegetable oil substantially eliminates the observed sensitivity to sugar level increases and renders it feasible to make excellent white cakes with the very highest practical sugar to flour ratios.

It is an object of the present invention to provide a liquid shortening which contains the most effective kind of saturated fatty acid monoglycerides so far as cake batter aerating properties are concerned.

It is also an object of the invention to provide a novel, economical process for dispersing the small quantity of normally solid saturated fatty acid monoglycerides in a salad oil base so as to form a stable suspension which resists settling for a long period of time.

It is also an object of the invention to provide a method for activating the preferred monoglycerides in the liquid shortening before use in cake batters in order to insure optimum performance.

It is also an object of the present invention to provide an additive which extends the useful range of liquid shortening to include high sugar to flour white cakes.

In broad aspect, the liquid shortening of the present invention is prepared from salad oil in which there is incorporated a minor amount of a monoglyceride of a saturated fatty acid having more than 18 carbon atoms. As is known, the salad oil suitable for the preparation of fluid shortening of the present invention may be any of those edible-grade oils which remain fluid at room temperature, and these include soybean oil, cottonseed oil, peanut oil, corn oil, safflower oil, as well as olive oil, sesame oil and others, as well as the liquid glyceride fractions obtained from animal fats. A salad oil, therefore, is constituted of triglycerides of higher fatty acids normally liquid above 60° F. and having an iodine value in the range of about 85 to 155.

There is incorporated, in accordance with the present invention, in the salad oil, a very minor amount of solid monoglyceride of those saturated fatty acids having more than 18 carbon atoms, of which the outstanding examples are glyceryl monobehenate and glyceryl monoarachidate, each relatively insoluble in salad oil at room temperature. The monoglyceride of the saturated fatty acid of more than 18 carbon atoms may be incorporated in the salad oil in any convenient manner, which will produce a relatively uniform distribution of the monoglyceride through the triglyceride oil.

It is important, to produce a final mixture in which the oil-insoluble solid monoglyceride is uniformly distributed throughout the triglyceride oil vehicle and remains so uniformly distributed for considerable periods of time to permit shipment, storage, and withdrawal and use of a portion of the composition having uniform and dependable characteristics in use. As in the prior art, this may be done by heating to dissolve the solid monoglyceride with subsequent chilling to obtain a fine, crystal dispersion, followed if desired by a tempering step to expedite the conversion of the suspended monoglyceride crystals to the stable beta form or by the novel equally effective and more economical process described in this invention.

The cake baking qualities of the liquid shortenings of the present invention were evaluated primarily with the pound cake test because among the various cake recipes which depend upon the batter aerating properties of shortening the pound cake test is most critical. Results obtained in the pound cake test will generally reflect shortening performance in most other cake recipes. The pound cake test owes its critical aspects to the absence of chemical leavening agents such as baking powder which is used in most other cakes. Cake volume in particular and to a considerable extent texture and grain of pound cakes is thus very closely correlated with the batter aerating properties of the shortening used. The following pound cake recipe was used to evaluate the liquid shortenings of this invention.

Pound cake recipe:

| | | |
|---|---|---|
| Cake flour | grams | 326 |
| Sugar (granulated) | do | 400 |
| Milk powder | do | 18 |
| Salt | do | 11½ |
| Fluid shortening | do | 253 |
| Whole eggs | do | 350 |
| Water | do | 170 |
| Vanilla | tsps | 2 |

*Blending method.*—The dry ingredients are combined in a 5 quart Hobart mixing bowl and mixed for a few minutes at low speed using a wire whip. The fluid shortening warmed to 140° F. in order to dissolve the emulsifiers, is first premixed with cold tap water, in order to reprecipitate the emulsifier in the active form. This mixture is then added to the dry ingredients in the bowl, and when the danger of spattering has passed, shift to medium speed. After about 1 to 2 minutes, start adding the eggs gradually while mixing for about 4 minutes. Shift to low speed and mix for 4 additional minutes.

The specific gravity of the finished batter was determined using a steel cup of known capacity. The batter was weighed into rectangular loaf-cake pans at 300 grams per pan. The cakes were baked in a laboratory size Despatch Oven at 325° F. On the following day, the volume of the cakes was determined by the conventional seed displacement method and the appearance, texture, and eating quality was appraised. Cake volumes ranging from 850 to 900 cc. constituted excellent performance. In this volume range the grain was usually quite fine, as a pound cake should be, the crust appearance was satisfactory and the texture and eating quality was good. The cake grain tended to open up excessively when the volume exceeded 900 cc. significantly. When the cake volume failed to reach 850, the evidence of unsatisfactory batter aeration was usually readily apparent. The specific gravity of the batter was generally high and many imperfections developed in the crust caused by the escape of loosely bound large air bubbles. In borderline cases, the crust imperfections constituted most important criteria of shortening weakness. Unsatisfactory pound cakes resulted when the batter specific gravity exceeded 0.65 significantly.

Although the pound cake test constitutes a good general method for evaluating the cake baking qualities of a shortening, it alone is not adequate to predict the performance of shortening in high sugar white cakes. In addition to the usual batter aerating properties it is essential that the shortening used in high sugar white cakes have the capacity to emulsify the relatively larger volumes of water which invariably accompany the higher sugar levels. Because such high sugar white cakes are quite extensively produced, it is essential that to be acceptable commercially a liquid shortening must have the capacity to yield satisfactory white cakes.

The following 140% sugar white cake recipe was used to evaluate the liquid shortening of this invention:

| | | |
|---|---|---|
| Cake flour | grams | 360 |
| Granulated sugar | do | 504 |
| Skim milk powder | do | 36 |
| Powdered egg white | grams | 36 |
| Baking powder | do | 22½ |
| Salt | do | 10¾ |
| Liquid shortening | do | 174 |
| Water | do | 576 |
| Vanilla | tsps | 2 |

*Blending method.*—Combine the dry ingredients in a 5 quart Hobart mixing bowl and mix for about 2 minutes using a wire whip. Warm the liquid shortening to a temperature of about 140° F. or until the mixture clears and then roughly premix the resulting solution with an equal amount of cold tap water in order to reprecipitate the saturated fatty acid monoglycerides in the active crystalline form before adding this portion of the fluids to the dry batter ingredients in the mixing bowl. Shift to medium speed and continue mixing for about 10 to 12 minutes while gradually adding the remainder of the water. Although the specific gravity of the batter is not critical in this case as it is in pound cakes, we found that white cake batters will usually run from about .625 to .670 in specific gravity. When 8 inch layers are scaled at 340 grams (12 oz.) and baked for 20–25 minutes at about 350° F., we obtain excellent appearing white cakes which run from 1000 to 1050 cc. in volume. These cakes are equivalent in every respect to white cakes made with plastic shortening.

The following examples will serve to illustrate the preferred liquid shortening formulas, the mode of making the liquid shortening, and the method of activating the emulsifiers included in the liquid shortening of the present invention.

EXAMPLE I

Fifteen parts by weight of glyceryl monobehenate and 15 parts by weight of glyceryl monostearate were dissolved in 150 parts, 105 parts, and 60 parts respectively of soybean salad oil by heating each mixture to about 170–180° F. The respective solutions were then added, under mild agitation during about 2 minutes to 1620, 1665 and 1710 grams of soybean salad oil at 70° F. and containing 18 parts of lecithin to make a total of 1800 parts of liquid shortening slurry. In each case a portion of each slurry was retained and other portions were passed through a colloid mill promptly, and after holding intervals of 15 and 60 minutes. The above experiment was replicated two more times using base oil temperatures of 40° F. and 100° F. instead of 70° F. to simulate extreme ambient temperature conditions which might be encountered in practice throughout the year. The suspended solids in the unmilled controls were almost completely settled out after standing over night. All of the milled samples exhibited a marked improvement in suspension stability. These runs demonstrated that optimum resistance to settling was obtained when the hot monoglyceride solution in salad oil comprised 7.5% and 10% of the weight of the finished liquid shortening, and when the crude slurries were milled in less than one hour of elapsed time after preparation of the crude slurry. Additional runs along the same lines demonstrated that milling should be accomplished within about 30 minutes after preparation of the crude slurry. These results proved that by proper control of the variables involved, within the limits described above, our new process is effective in preparing liquid shortening in the form of suspensions containing fine uniform dispersions of solid saturated fatty acid monoglycerides which resist settling for several months. Excellent pound cakes and white cakes were prepared with the liquid shortenings of this example using recipes and blending methods as previously described.

EXAMPLE II

The following example illustrates the importance of the so called emulsifier activation process. Pound cake batters were prepared with liquid shortening of the composition described in Example I. In the first test the liquid shortening was used as such while in the other the liquid shortening was heated to melt the suspended emulsifier and then the melted liquid shortening was pre-mixed with cold tap water before addition to the dry batter ingredients in order to reprecipitate the emulsifier as a suspended solid in the active form. When the unactivated liquid shortening was used in a pound cake batter, the batter failed to incorporate air, exhibiting a specific gravity of about 1.07. This batter yielded dense pound cakes having a volume of about 500 cc. per 300 grams of batter. When the same liquid shortening was properly activated the batter whipped up readily to a specific gravity of .63 and fine pound cakes which exhibited a volume of 900 cc. per 300 grams of batter were obtained.

EXAMPLE III

Liquid shortenings were prepared in accordance with the process described in Example I, in which the saturated fatty acid monoglyceride was respectively glyceryl monopalmitate, glyceryl monostearate, glyceryl monoarachidate and glyceryl monobehenate using soybean salad oil as a base. When pound cakes were baked with the resulting liquid shortenings using the previously described recipe and blending method the results shown in the following table were obtained.

*Table I*

EFFECT OF FATTY ACID CHAIN LENGTH ON MONOGLYCERIDE ACTIVITY IN POUND CAKES

| 1.41% Distilled Mono in Salad Oil | Specific Gravity of Batter | Cake Volume, cc. |
|---|---|---|
| Glyceryl monopalmitate ($C_{16}$) | 1.07 | 400 |
| Glyceryl monostearate ($C_{18}$) | 1.07 | 400 |
| Glyceryl monoarachidate ($C_{20}$) | 0.635 | 860 |
| Glyceryl monobehenate ($C_{22}$) | 0.582 | 920 | arachidate, and glyceryl monobehenate at the 1.41% concentration in soybean salad oil. Each liquid shortening involved in this series included 0.5% lecithin.

We found that a conventional yellow layer cake test wherein the specific batter aerating properties of the shortening are considerably less critical than in pound cakes served best to show that the longer chain monoglycerides remain active longer than the shorter chain homologs after having been freshly precipitated from solution in salad oil. The following yellow layer cake recipe was used:

Yellow layer cake recipe:
```
    Cake flour _____ grams __ 360
    Sugar _____ do ____ 432
    Milk powder _____ do ____  45
    Salt _____ do ____  10.8
    Fluid shortening _____ do ____ 144
    Whole eggs _____ do ____ 180
    Water _____ do ____ 416
    Vanilla _____ tsps __   2
```

Each liquid shortening portion was heated to melt the normally solid monoglycerides and then cooled in a water bath to reprecipitate the solid monoglycerides in the desired active form. The resulting active liquid shortening suspension was subsequently incorporated into the batter after various intervals of elapsed time up to thirty minutes. We chose to refer to the test run immediately after precipitation had been effected as "zero time." In each case one test called "instantaneous time" was also run wherein the warm melted liquid shortening and some cold tap water were added simultaneously to the dry batter ingredients.

The batter specific gravity values and the cake volumes obtained from these tests are included in the following table:

*Table II*

ACTIVATION RETENTION TIME OF VARIOUS SATURATED FATTY ACID MONOGLYCERIDES WHEN USED IN LIQUID SHORTENING BASED ON PERFORMANCE IN YELLOW LAYER CAKES

|  | Instantaneous | | Zero Time | | 15 Min. | | 30 Min. | |
|---|---|---|---|---|---|---|---|---|
|  | Sp. Gr. of Batter | Cake Vol., cc. | Sp. Gr. of Batter | Cake Vol., cc. | Sp. Gr. of Batter | Cake Vol., cc. | Sp. Gr. of Batter | Cake Vol., cc. |
| Glycerol Monopalmitate | 1.160 | 300 |  |  |  |  |  |  |
| Glycerol Monostearate | 0.658 | 1,100 | .715 | 1,100 | 1.120 | 400 |  |  |
| Glycerol Monoarachidate | 0.670 | 1,100 | .668 | 1,130 | .681 | 1,050 | .681 | 1,050 |
| Glycerol Monobehenate | 0.650 | 1,100 | .654 | 1,130 | .681 | 1,100 | .738 | 1,100 |

It is obvious from these data that the monoglycerides derived from saturated fatty acids having a chain length greater than 18 carbon atoms, namely glyceryl monobehenate and glyceryl monoarachidate were considerably more effective insofar as their contribution to pound cake batter aeration and cake volume are concerned than the monoglycerides derived from saturated fatty acids having less than 20 carbon atoms namely, glyceryl monostearate and glyceryl monopalmitate.

EXAMPLE IV

The superior cake batter aerating properties of the monoglycerides derived from saturated fatty acids having a chain length greater than 18 carbon atoms are also exemplified by the results obtained in a so called activation retention study. Liquid shortenings were prepared as described in Example I using respectively glyceryl monopalmitate, glyceryl monostearate, glyceryl mono- It is apparent from these data that glyceryl monobehenate and glyceryl monoarachidate remain active considerably longer than either of the other two distilled monoglycerides. While the glyceryl monostearate was activated and did yield satisfactory yellow layer cakes the activity was short lived and actually insufficient to be of value in pound cakes as shown in Example III. Since glyceryl monopalmitate failed to work even on the "instantaneous time," basis it is obvious that this particular monoglyceride is not useful as a liquid shortening additive.

EXAMPLE V

Since the monoglycerides of the saturated fatty acids having a chain length greater than 18 carbon atoms are considerably more expensive than the previously mentioned more readily available shorter chain saturated fatty acid monoglyceride, liquid shortenings were prepared in accordance with the process described in Example I, in which several combinations of the two classes of monoglycerides were combined in various proportions, always at the same total monoglyceride concentration, in an effort to determine if the more effective longer chain monoglycerides might have the capacity to transmit or transfer some of their superior cake batter aerating properties to the relatively ineffective shorter chain homologs. The pound cake results obtained with these liquid shortenings are included in the next three tables.

*Table III*

THE BATTER AERATING PROPERTIES AND CAKE VOLUME PERFORMANCE OF GLYCERYL MONOBEHENATE-GLYCERYL MONOSTEARATE MIXTURES

| Percent GMB | Percent GMS | Specific Gravity of Batter | Cake Volume, cc. |
|---|---|---|---|
| 1.41 | 0.00 | .582 | 920 |
| 0.75 | 0.66 | .625 | 860 |
| 0.50 | 0.91 | .635 | 830 |
| 0.25 | 1.16 | 1.05 | 400 |
| 0.00 | 1.41 | 1.07 | 400 |

*Table IV*

THE BATTER AERATING PROPERTIES AND CAKE VOLUME PERFORMANCE OF GLYCERYL MONOBEHENATEGLYCERYL MONOPALMITATE MIXTURES

| Percent GMB | Percent GMP | Specific Gravity of Batter | Cake Volume, cc. |
|---|---|---|---|
| 1.41 | 0.00 | .582 | 920 |
| 1.00 | 0.41 | .635 | 860 |
| 0.75 | 0.66 | .942 | 400 |
| 0.50 | 0.91 | 1.09 | 300 |
| 0.00 | 1.41 | 1.07 | 400 |

*Table V*

THE BATTER AERATING PROPERTIES AND CAKE VOLUME PERFORMANCE OF GLYCERYL MONOARACHIDATEGLYCERYL MONOSTEARATE MIXTURES

| Percent GMA | Percent GMS | Specific Gravity of Batter | Cake Volume, cc. |
|---|---|---|---|
| 1.41 |  | .635 | 860 |
| 1.00 | 0.41 | .610 | 860 |
| 0.75 | 0.66 | .940 | 400 |
| 0.50 | 0.91 | 1.09 | 300 |
| 0.00 | 1.41 | 1.07 | 400 |

It is quite apparent from these results that the more effective monoglycerides can to some extent impart their superior cake batter aerating properties to the less effective homologs.

EXAMPLE VI

The effective concentration range of the preferred monoglycerides required to obtain optimum performance in pound cakes was determined by preparing liquid shortenings as in Example I, containing concentrations of commercial distilled glyceryl monobehenate varying from 0.75% to 1.75% in soybean salad oil, and subjecting the resulting liquid shortening products to the aforementioned pound cake test. The results are included in the following table.

*Table VI*

THE EFFECT OF MONOGLYCERIDE (GLYCERYL MONOBEHENATE) CONCENTRATION ON THE POUND CAKE BAKING PROPERTIES OF LIQUID SHORTENING

| Percent Mono | Specific Gravity of Batter | Cake Volume, cc. | Appearance & Texture |
|---|---|---|---|
| 1.75 | .582 | 920 | Excellent. |
| 1.41 | .582 | 920 | Do. |
| 1.25 | .605 | 880 | Few undesirable air holes. |
| 1.00 | .648 | 800 | Some undesirable air holes. |
| 0.75 | .670 | 730 | Many undesirable air holes. |

These data demonstrate that the minimum effective concentration of the preferred commercial saturated fatty acid monoglycerides in liquid shortening is close to 1.25% and that no additional benefits accrue from concentrations in excess of 1.75%.

EXAMPLE VII

The following example illustrates how lecithin contributes to the broad use properties of our preferred liquid shortenings. In this case the lecithin content of a liquid shortening containing 0.75% of distilled glyceryl monobehenate and 0.66% of glyceryl monostearate was varied between 0.25% and 1.00%. The white layer cake results obtained are included in the following table.

*Table VII*

EFFECT OF LECITHIN LEVEL IN LIQUID SHORTENING ON 140% SUGAR WHITE LAYER CAKE PERFORMANCE

| Lecithin Concentration | Cake Volume, cc. | General Appearance of Cake |
|---|---|---|
| 0.25 | 900 | Poor uneven texture—sunken centers. |
| 0.35 | 900 | Do. |
| 0.50 | 1030 | Good cake in all respects. |
| 0.75 | 1050 | Do. |
| 1.00 | 1040 | Do. |

It is obvious from these results that the inclusion of an adequate level of lecithin in liquid shortening greatly improves its performance in white cakes.

EXAMPLE VIII

A liquid shortening was prepared using the process described in Example I, in which 0.75% commercial glyceryl monobehenate and 0.75% glyceryl monostearate were suspended in cottonseed oil to which was added 1.0% of lecithin. Excellent pound cakes and white cakes were made with this liquid shortening using the recipe and blending methods herein described.

EXAMPLE IX

Liquid shortenings were made as described in Example I using 1.75% glyceryl monobehenate in each case but one lot included 1.0% lecithin while the other did not. Equivalent pound cakes were obtained with these two liquid shortenings.

In summary, the fluid shortening of the present invention comprises a salad oil formulated with about 1.5% of saturated fatty acid monoglycerides, at least 50% of which comprise monoglycerides of saturated fatty acids having a chain length greater than 18 carbon atoms.

This fluid shortening is most economically prepared by forming a solution of the preferred monoglycerides in a controlled portion of the salad oil base mixing this relatively warm solution with the remainder of the salad oil at ambient temperature and then milling or homogenizing the resulting crude slurry within a controlled period of time after the preparation of the slurry was completed.

The liquid shortening of this invention should be treated to activate the suspended saturated fatty acid monoglycerides more or less immediately prior to its incorporation into a cake batter. Activation comprises heating the liquid shortening until the suspended solids melt and then cooling the mixture so as to reprecipitate the solid saturated fatty acid monoglycerides in the active form. The cooling phase of this activation process may be conveniently carried out in practice by combining the melted liquid shortening with cold tap water (included in the recipe) prior to or simultaneously with addition to dry ingredients of the batter.

Lecithin is not an essential additive in the general sense to bring out the superior functional properties of the specified monoglycerides of fatty acids having a chain length greater than 18 carbon atoms. While lecithin appears to exert some minor beneficial effects in grain and texture of pound cakes, yellow cakes and chocolate cakes etc., it is primarily because of its dramatic contribution to the liquid shortening performance in high sugar white cakes that we include lecithin as a desirable additive to the liquid shortening of this invention.

What is claimed is:

1. A fluid shortening comprising a normally liquid edible triglyceride oil as the major ingredient and from about 0.50% to about 1.75% of normally solid monoglycerides of a saturated fatty acid having a chain length greater than 18 carbon atoms uniformly distributed therein.

2. A fluid shortening comprising normally liquid edible triglyceride oil containing uniformly distributed therein a normally solid monoglyceride of a saturated fatty acid selected from the group of fatty acids consisting of behenic acid and arachidic acid in which the monoglyceride of the mentioned acids is present in the range of about 0.50% to about 1.75%.

3. A fluid shortening comprising normally liquid edible triglyceride oil as the major ingredient and uniformly distributed therein from about 0.50% to about 1.75% of a normally solid monoglyceride of a saturated fatty acid having more than 18 carbon atoms and from about 0.50% to about 1.25% of commercial edible grade lecithin.

4. A fluid shortening comprising normally liquid edible triglyceride oil as the major ingredient and uniformly distributed therein from about 0.50% to about 1.75% of normally solid monoglycerides of a saturated fatty acid selected from the group of fatty acids consisting of behenic and arachidic acids and from 0.50% to 1.25% of a commercial edible grade of lecithin.

5. A liquid shortening comprising a normally liquid triglyceride oil and uniformly distributed therein from about 0.50% to about 1.75% of normally solid commercial monoglycerides, said monoglycerides being made up of at least 50% by weight of a commercial monoglyceride of a saturated fatty acid having a chain length greater than 18 carbon atoms and not more than 50% by weight of a commercial monoglyceride of a saturated fatty acid having a chain length of less than 20 carbon atoms.

6. A liquid shortening comprising a normally liquid triglyceride oil and uniformly distributed therein from about 0.50% to about 1.75% of normally solid commercial monoglycerides, said monoglycerides being made up of at least 50% by weight of a commercial monoglyceride of a saturated fatty acid having a chain length greater than 18 carbon atoms and not more than 50% by weight of a commercial monoglyceride of a saturated fatty acid having a chain length of less than 20 carbon atoms and from about 0.50% to about 1.25% of a commercial edible grade of lecithin.

7. A liquid shortening comprising soybean salad oil containing suspended therein about 0.60% to about 0.90% of commercial distilled glyceryl monobehenate, and about 0.60% to 0.90% commercial distilled glyceryl monostearate.

8. A liquid shortening comprising soybean salad oil containing suspended therein about 0.60% to about 0.90% of commercial distilled glyceryl monobehenate, and about 0.60% to 0.90% commercial distilled glyceryl monostearate and from 0.50% to 1.25% of a commercial edible grade of lecithin.

9. A liquid shortening comprising cottonseed salad oil containing suspended therein about 0.60% to about 0.90% of commercial distilled glyceryl monobehenate, about 0.60% to 0.90% commercial distilled glyceryl monostearate and including about 1.0% of a commercial edible grade of lecithin.

10. A liquid shortening comprising a normally liquid triglyceride oil containing suspended therein a commercial monoglyceride mixture made up of about 0.37% glyceryl monobehenate, about 0.41% glyceryl monoarachidate, about 0.48% glyceryl monostearate and about 0.23% glyceryl monopalmitate and about 1.0% commercial edible grade lecithin.

11. A liquid shortening comprising a normally liquid triglyceride oil and uniformly distributed therein about 0.50% to about 1.75% of normally solid commercial monoglycerides, said monoglycerides being made up of at least 50% by weight of commercial monoglycerides of a saturated fatty acid having a chain length greater than 18 carbon atoms and not more than about 50% by weight of a monoglyceride of a saturated fatty acid having a chain length less than 20 carbon atoms, said commercial monoglycerides containing not more than about 20% by weight of diglycerides of said saturated fatty acids.

12. A liquid shortening comprising a normally liquid triglyceride oil and uniformly distributed therein about 0.50% to about 1.75% of normally solid commercial monoglycerides, said monoglycerides being made up of at least 50% by weight of commercial monoglycerides of a saturated fatty acid having a chain length greater than 18 carbon atoms and not more than about 50% by weight of a monoglyceride of a saturated fatty acid having a chain length less than 20 carbon atoms, said commercial monoglycerides containing not more than about 20% by weight of diglycerides of said saturated fatty acids and from 0.50% to 1.25% of a commercial edible grade of lecithin.

13. A method of making a liquid shortening containing from about 1.25% to about 1.75% of normally solid commercial monoglycerides of saturated fatty acids having more than 18 carbon atoms uniformly distributed in normally liquid edible triglyceride oil comprising first preparing a solution of the total requirements of said monoglycerides in about 5 to 10% of the total amount of normally liquid edible triglyceride oil included in the final product by heating the mixture of said normally solid monoglycerides and edible triglyceride oil to about 170 to 180° F. until the normally solid monoglycerides melt and dissolve, then mixing the resulting hot solution with the remaining edible triglyceride oil at ambient temperature under mild agitation to form a crude suspension and subsequently colloid milling this crude suspension within about 30 minutes elapsed time after the preparation of the crude suspension was completed.

14. A method of making a liquid shortening containing from 1.25 to 1.75% of normally solid commercial saturated fatty acid monoglycerides selected from the group consisting of glyceryl monobehenate and glyceryl monoarachidate uniformly distributed in a normally liquid edible triglyceride oil by first preparing a solution of the total requirement of said normally solid monoglycerides in 5 to 10% of the total amount of normally liquid edible triglyceride oil comprising said mixture until the normally solid components melt and dissolve, then mixing this hot solution with the bulk of the normally liquid edible triglyceride oil at ambient temperature under mild agitation to form a crude slurry and subsequently colloid milling said slurry within about 30 minutes elapsed time after the mixing of the hot solution with the bulk of the edible triglyceride oil at ambient temperature was completed.

15. A method of making a liquid shortening which comprises dissolving by heating together about 0.50% to about 0.90% of commercial glyceryl monobehenate and about 0.50% to about 0.90% of commercial glyceryl monostearate in from 5 to 10% of the total amount of soybean salad oil to be included in the final shortening, combining under mild agitation the resulting solution with the remainder of the soybean oil to be included in the final shortening at ambient temperature and adding thereto about 0.5% to about 1.25% lecithin to form a crude slurry and subsequently colloid milling this crude slurry within about 30 minutes of elapsed time after the crude suspension was prepared.

16. A method of making a liquid shortening of soybean salad oil which comprises dissolving a commercial monoglyceride mixture made up of about 0.37% glyceryl monobehenate, about 0.41% glyceryl monoarachidate, about 0.48% glyceryl monostearate, and about 0.23% glyceryl monopalmitate in from 5 to 10% of the total amount of soybean salad oil included in the final shortening by heating said monoglycerides with soybean salad oil until the normally solid monoglycerides melt and dissolve, then combining under mild agitation the resulting solution with the remainder of the soybean salad oil to be included in the final shortening at ambient temperature and adding thereto from about 0.5% to about 1.25% of commercial edible grade lecithin to form a crude suspension and subsequently colloid milling said crude suspension within about 30 minutes of elapsed time after the crude suspension was prepared.

References Cited in the file of this patent

UNITED STATES PATENTS

| | | |
|---|---|---|
| 2,494,711 | Markley | Jan. 17, 1950 |
| 2,868,652 | Brock | Jan. 13, 1959 |
| 2,875,065 | Thompson | Feb. 24, 1959 |